D. TURNER.
LEATHER MEASURING MACHINE.
APPLICATION FILED FEB. 7, 1920.
1,390,313.
Patented Sept. 13, 1921.
4 SHEETS—SHEET 1.
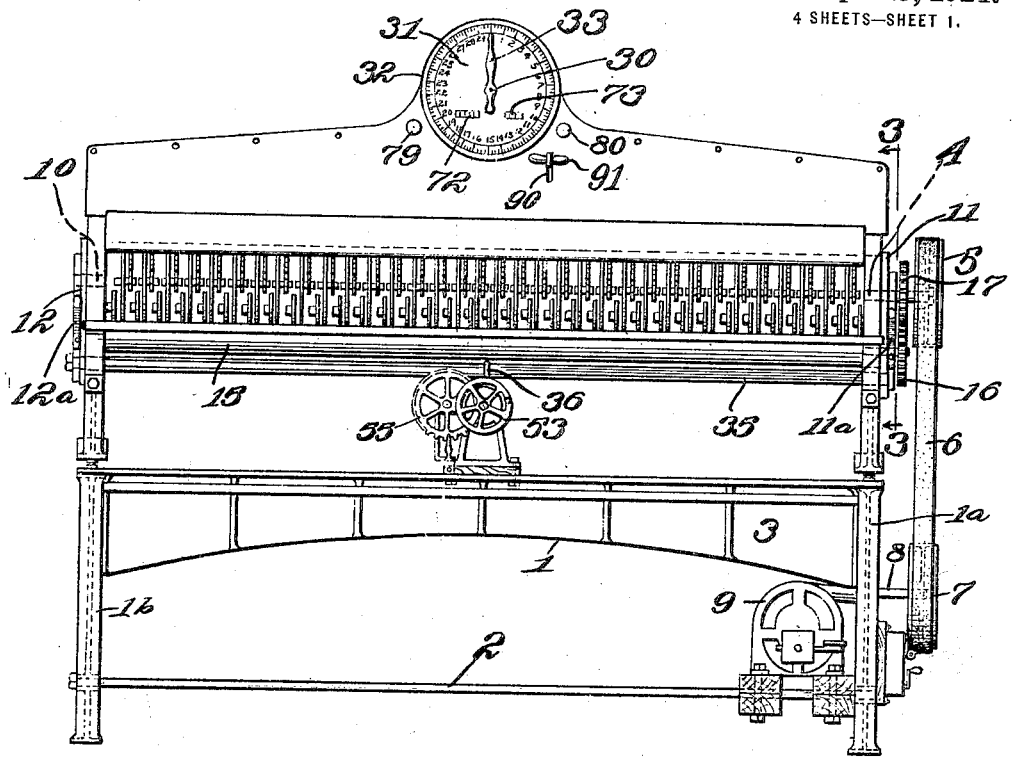
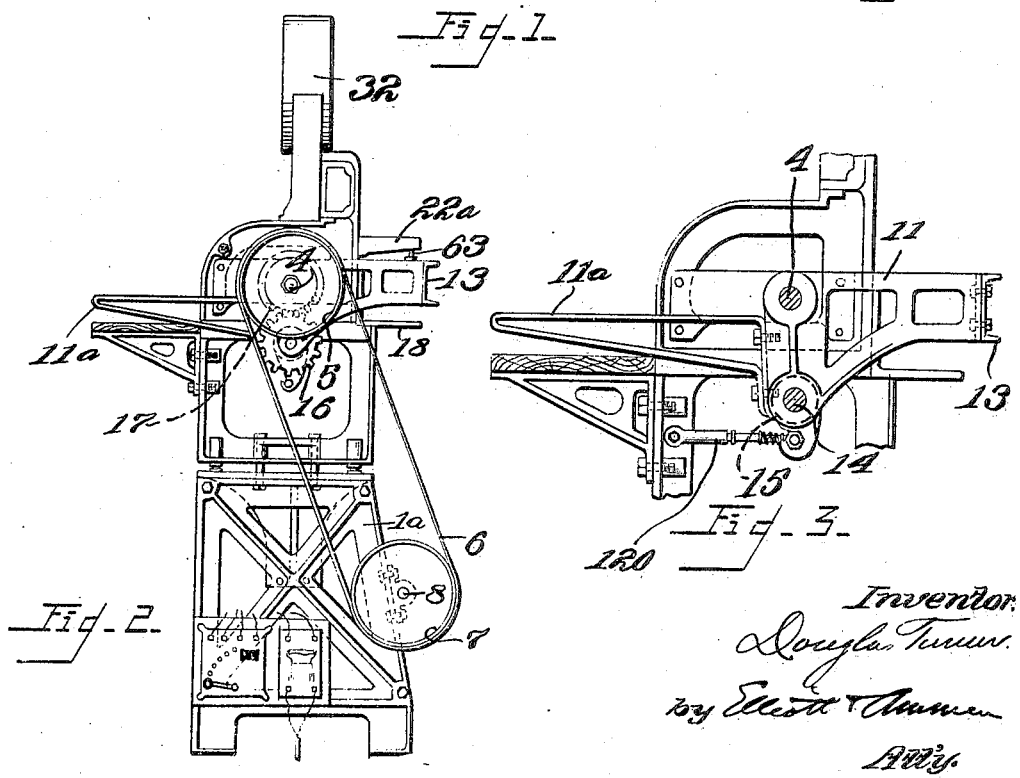

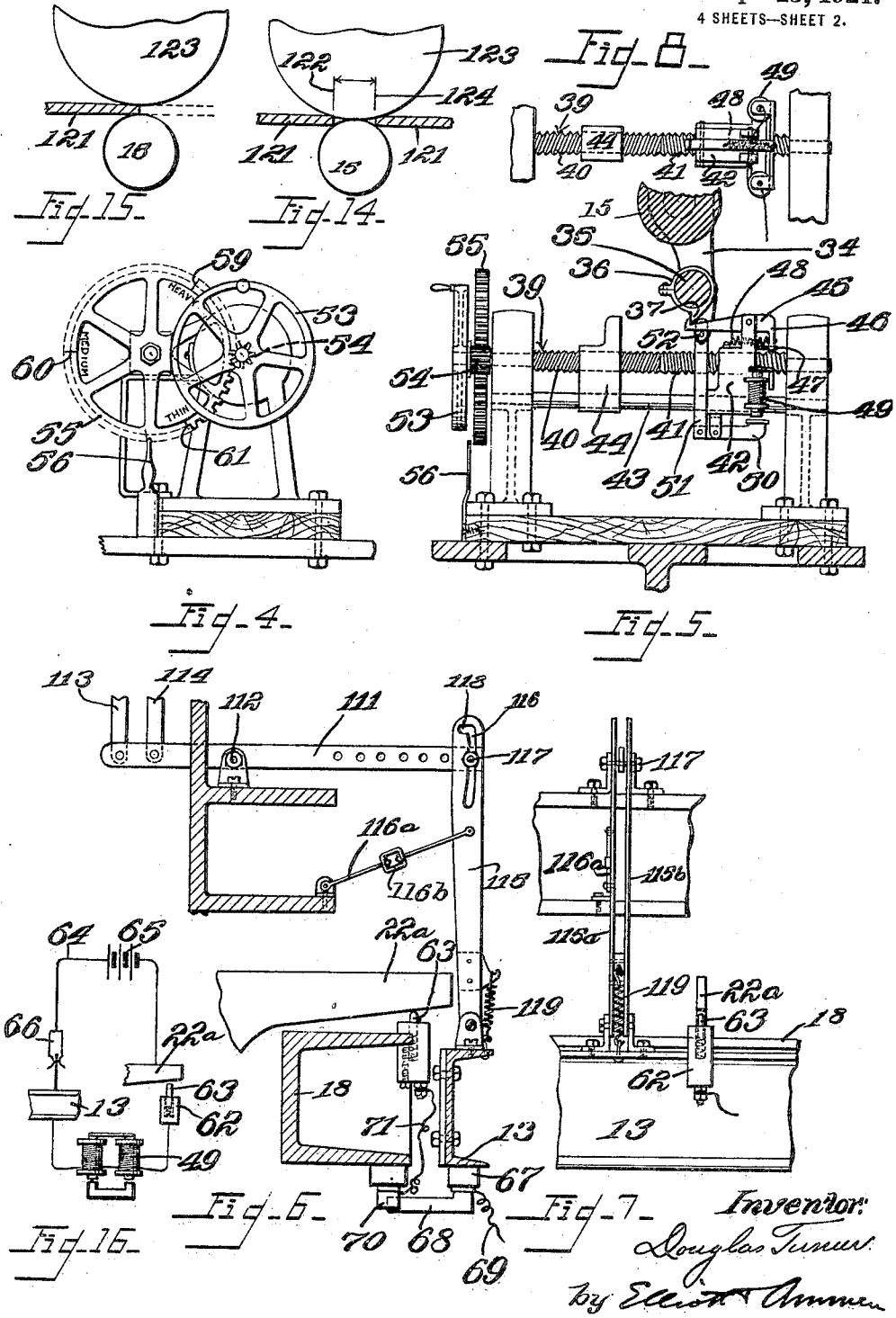

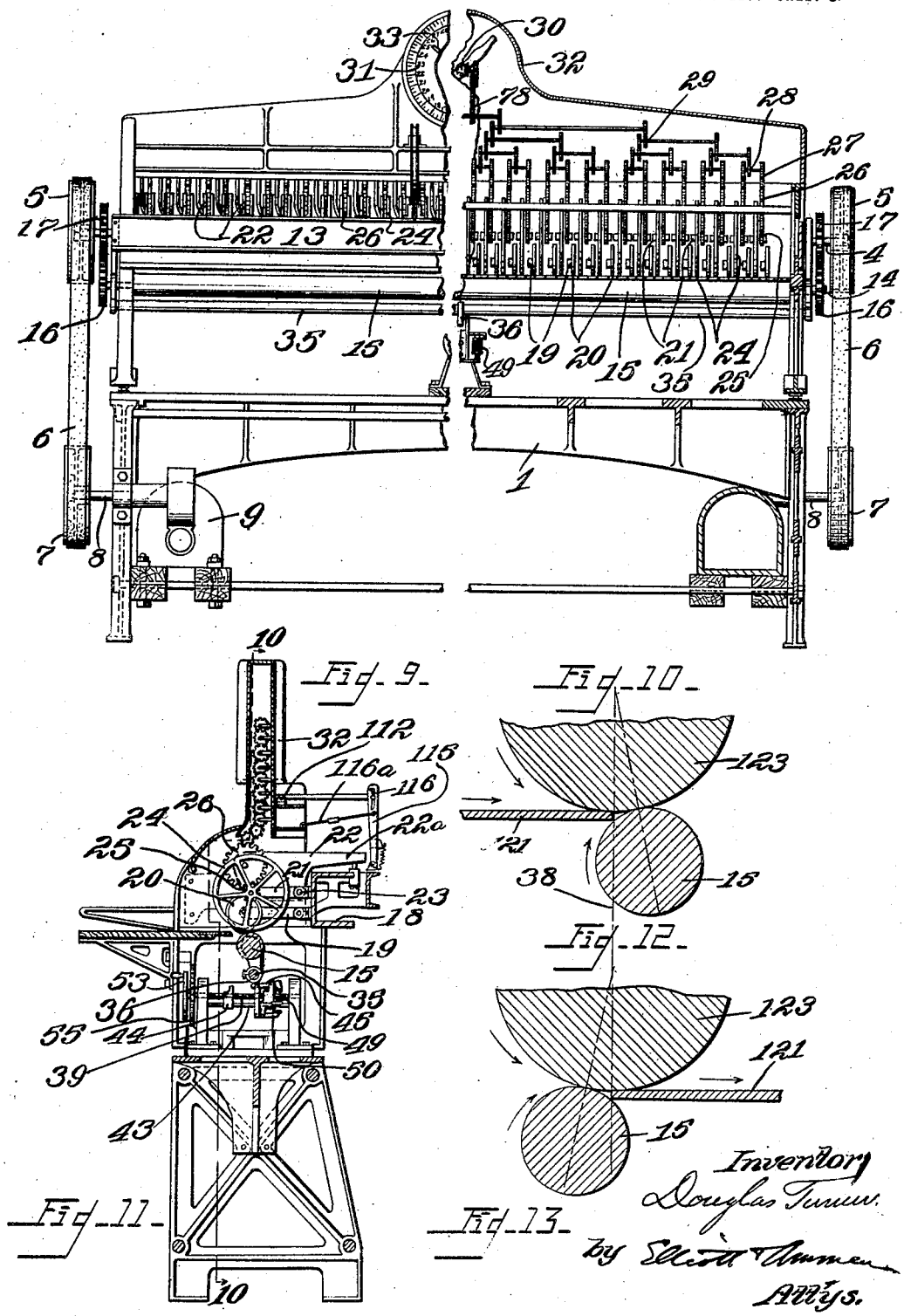

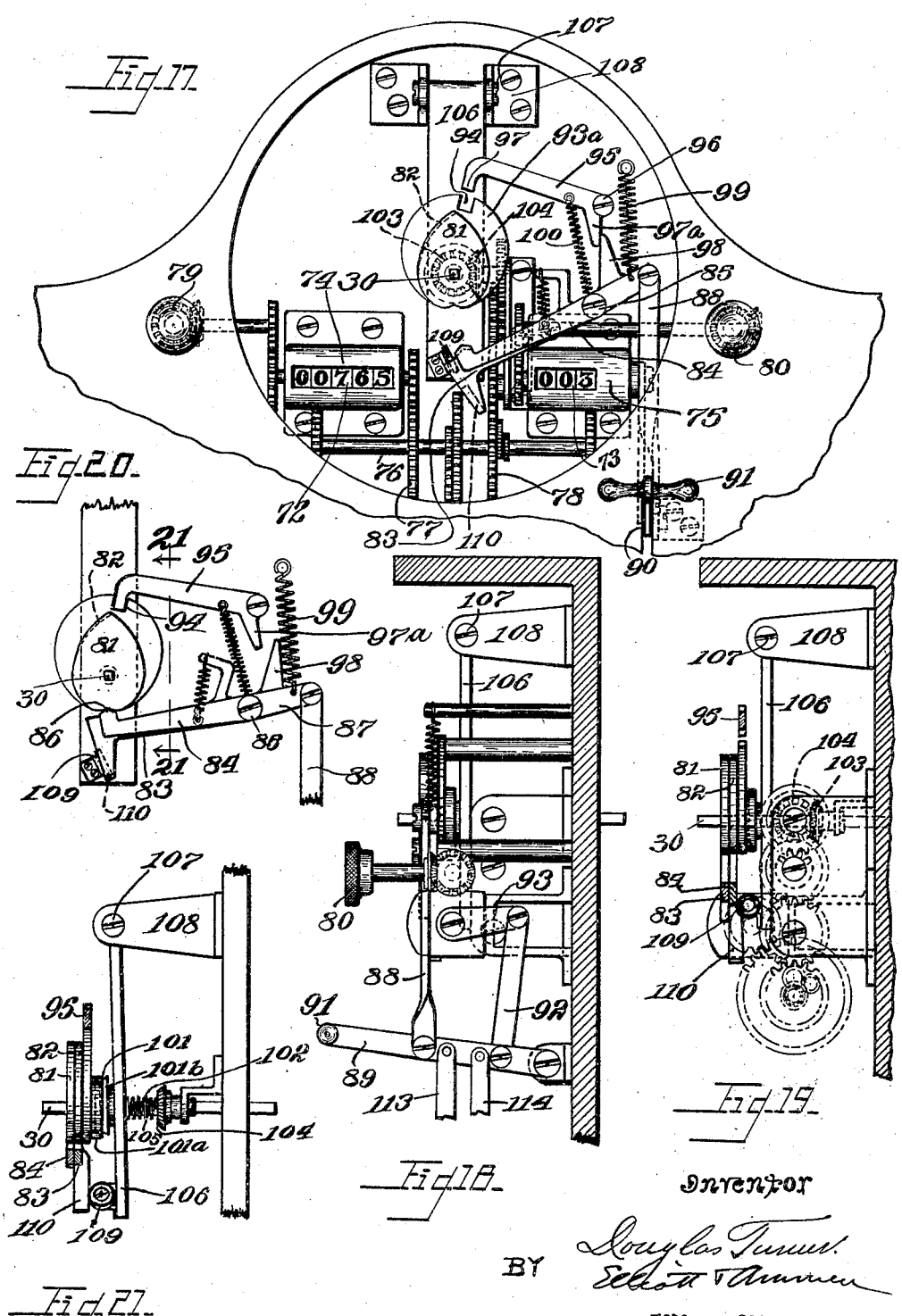

UNITED STATES PATENT OFFICE.

DOUGLAS TURNER, OF ST. LOUIS, MISSOURI, ASSIGNOR TO THE HOSCH MECHANISMS CORPORATION, OF ST. LOUIS, MISSOURI, A CORPORATION OF MISSOURI.

LEATHER-MEASURING MACHINE.

1,390,313.     Specification of Letters Patent.     Patented Sept. 13, 1921.

Application filed February 7, 1920. Serial No. 356,827.

*To all whom it may concern:*

Be it known that I, DOUGLAS TURNER, a citizen of the United States, residing in the city of St. Louis and State of Missouri, have invented new and useful Improvements in Leather-Measuring Machines, of which the following is a specification.

This invention relates to integrating machines, such as used for integrating or measuring the area of surfaces of irregular outline, such as hides. In machines of this general type, there is usually provided an elongated roller which is power-driven. Over this roller, the hide passes and as it moves past the roller the upper face of the hide contacts with and rotates a plurality of rollers, or measuring wheels, the rotation of which is imparted to a dial through differential mechanisms, so that the indicating dial will indicate the total movement of all the rollers or measuring wheels; and this figure is an index of the area of the sheet or hide which is measured.

In such machines, an inaccuracy occurs on account of the thickness of the leather, because the machine commences to measure before the forward edge of the hide arrives exactly at the vertical line or plane joining the center of the lower roller with the center of the small measuring wheels that roll on the upper face of the hide; and the measuring operation does not cease until after the rear edge of the hide has passed this line. For this reason, these machines, as ordinarily constructed, indicate a measurement which is slightly too great, that is to say, they give an overmeasurement for the hide, and indicate a slightly greater area than the hide actually possesses.

The general object of the present invention is to provide simple means for overcoming this defect and to provide means which will enable the indicator of the machine to show the true area of the hide. The indicating mechanism which I provide includes a counter for counting the number of hides measured, and a totalizer which indicates the total area of all the hides measured, and an indicating dial which indicates the area of the particular hide being measured. I provide simple means for automatically advancing the counter to indicate each hide measured, and also provide means for automatically setting back the hand of the indicating dial to its zero position after each hide is measured. The invention includes simple compensating mechanism, and means for regulating the same so that a correction or compensation will be effected which will correspond properly to different thicknesses of hide. In other words, I provide a correcting or compensating device that gives the machine an automatic correcting movement to correct the inherent inaccuracy in machines of this type, and I provide for regulating the amount of the compensating movement so as to adapt it accurately to the thickness of each hide. This is advisable because it is obvious that the inaccuracy in measurement which occurs in the manner suggested above will be greater, the greater the thickness of the hide.

Further objects of the invention will appear hereinafter.

The invention consists in the novel features, and in the general combination of parts to be particularly described hereinafter, all of which contribute to produce a simple and efficient leather measuring machine. A preferred embodiment of my invention will be particularly described in the following specification, while the broad scope of my invention will be pointed out in the appended claims.

In the drawing:

Figure 1 is a front elevation of the complete machine;

Fig. 2 is an elevation showing the right side of the machine as viewed in Fig. 1;

Fig. 3 is a section upon an enlarged scale, taken about on the line 3—3 of Fig. 1;

Fig. 4 is a front elevation upon an enlarged scale illustrating the regulating mechanism for adapting the machine to make compensation corresponding to hides of different thicknesses;

Fig. 5 is a side elevation of the regulating mechanism shown in Fig. 4, and showing other parts of the mechanism in section;

Fig. 6 is a vertical section taken at the rear side of the machine and upon an enlarged scale, particularly illustrating details of the mechanism for actuating the counter and set-back mechanism which sets the pointer of the indicating dial back to zero;

Fig. 7 is a rear elevation showing the parts indicated in Fig. 6;

Fig. 8 is a plan showing parts of the mechanism indicated in Fig. 5;

Fig. 9 is a fragmentary view showing a rear elevation of substantially half of the machine;

Fig. 10 is a vertical section showing the same parts indicated in Fig. 9, but looking toward the back of the machine; this section is taken about on the line 10—10 of Fig. 11;

Fig. 11 is a vertical transverse section taken through the machine;

Fig. 12 is a diagrammatic view illustrating the relation of the driven roller and one of the measuring wheels with respect to the leather at the moment when the leather is passed into the machine;

Fig. 13 is a view similar to Fig. 12, but illustrating the roller after it has had its compensating movement, and indicating the leather passing out of the machine;

Figs. 14 and 15 are diagrammatic views illustrating the manner in which the error referred to arises;

Fig. 16 is a wiring diagram illustrating means for initiating the movement of the compensating mechanism;

Fig. 17 is a front elevation of the machine with the front dial removed so as to display the mechanism on the interior which is associated with the counter that indicates the number of hides measured, and the set-back mechanism which sets the pointer of the dial back to zero;

Fig. 18 is a vertical section through the casing shown in Fig. 17 and further illustrating details of this mechanism;

Fig. 19 is a view similar to Fig. 18, but the section is taken nearer the center line of the machine;

Fig. 20 is a front elevation, indicating parts of the mechanism for returning the pointers of the dial to the zero position; and Fig. 21 is a vertical section taken about on the line 21—21 of Fig. 20, particularly illustrating the means for opening the clutch through which the dial-pointer is actuated.

The frame 1 of the machine comprises two side frames 1ᵃ and 1ᵇ connected together below by a tie-rod 2, and connected about mid-way of their height by a cross bar or beam 3 (see Fig. 1). In the upper part of the side frame 1ᵃ, I provide a stub-shaft 4 to which is attached a pulley 5 driven by a belt 6 from another pulley 7, the latter pulley being carried on a shaft 8 driven by a motor 9 mounted on the lower part of the frame of the machine.

In alinement with the stub-shaft 4, but on the opposite end frame 1ᵇ, I provide a pivot pin 10; mounted to rock respectively on the stub-shaft 4 and the pivot pin 10, I provide a rocking-frame which comprises end brackets 11 and 12 that extend rearwardly and are connected by a channel-bar 13 (see Fig. 3). These brackets 11 and 12 are alike and are connected near their lower ends by a guide roller 15 having trunnions 14 mounted to rotate in the brackets 11 and 12. In order to drive this roller, one of its trunnions 14 extends beyond the right hand end frame 1ᵃ and carries a gear wheel 16 which is driven by a gear wheel 17 carried on the shaft 4 of the pulley 5.

From this it will be evident that when the motor 9 is in operation the roller 15 will be rotated continuously; the direction of this rotation is that indicated by the arrow in Figs. 12 and 13.

Referring especially to Fig. 11, the rear side of the frame of the machine includes a horizontal channel shaped cross bar 18 and on the vertical web of this cross bar a plurality of small arms 19 are mounted which project horizontally forward and which carry small traction rollers 20. These rollers rest by their own weight and the weight of the arms, on the hide, and press the hide against the roller 15 so that as the roller rotates, the hide will be pulled through the machine.

At a higher level than the arms 19, I provide bifurcated arms, each bifurcated arm comprising an arm 21 in the form of a bar similar to the arms 19, and an arm 22 which is in the form of a plate; the arms 21 and 22 are both pivotally mounted at 23 on the forward side of the vertical web of the channel bar 18. One of these arms 21 and a corresponding plate 22 carry a measuring roller or wheel 24. There are a great many of these measuring wheels, and each one carries a pinion 25 to drive a gear wheel 26 rotatably mounted on the plate 22. Each of these gear wheels 26 drives a corresponding gear-train 27 (see Fig. 9). These gear trains 27 all drive differential mechanisms 28 through other differential mechanisms 29, and finally drive the spindle 30 on the indicating dial 31. This spindle extends from front to rear through the indicator 32 and both sides of the indicator are provided with a dial 31. Each end of the spindle 30 is provided with a hand or pointer 33 so that the indicator can be read either from the front or rear of the machine.

I do not claim any novelty in this mechanism by means of which the measuring wheels 24 drive the indicator pointers 33. Any suitable differential mechanism may be used for this purpose which will integrate movements of all the measuring wheels.

Referring especially to Figs. 5, 12 and 13, it should be understood that the latching mechanism shown in Fig. 5 normally operates to hold the brackets 11 and 12 in an extreme rearward position so as to hold the roller 15 in the relation shown in Fig. 12. When a hide is put into the machine the latch mechanism shown in Fig. 5 is automatically actuated to release the brackets 11 and 12, whereby they swing forwardly on their pivots, that is to say, on the shaft 4 and on the pivot 10, and this gives the roller 15 a circumferential movement with respect to the wheels 24, and brings the roller 15 into the relation shown in Fig. 13. In order to accomplish this, the end brackets 11 and 12 have downwardly extending arms 34 (see Fig. 5) and between these arms there is carried a cross bar 35 on which there is attached rigidly, a collar 36 carrying a dog or tooth 37. This collar 36 is located near the middle of the cross bar 35 (see Fig. 1). I provide latching means to coöperate with the dog 37 to latch the roller 15 in the position shown in Fig. 10, and this latching means is regulated by suitable regulating mechanism to regulate or adjust the distance that the roller 15 is held to the rear of the line or central plane 38 which passes through the axes of the measuring wheels 24.

The latching mechanism includes a regulating screw 39 having a left-hand threaded portion 40, and a right-hand threaded portion 41, on the latter of which there is mounted a block 42 operating as a nut, the lower portion of the block being guided on a guide bar 43 which extends parallel with the regulating screw 39. On the left-hand thread 40 there is mounted a block 44 which operates as a stop to engage the dog 37 when it is unlatched and limits the swinging movement of the roller 15 toward the front. On the block 42 there is pivotally mounted a latch or pawl 45 the end of which is formed into a hook to engage the dog 37, the other end of the latch being formed into a tail 46 carrying an adjusting screw 47 for limiting the movement of the pawl 45 under the action of a coil spring 48. In order to release the latch 45 at the proper time, I provide an electro-magnet 49 which is carried by the block 42, the armature 50 for this electro-magnet being in the form of a lever pivotally mounted on the under side of the block, the remote end of which carries a link 51; the upper end of this link is pivotally attached at 52 to the outer end of the pawl or latch 45. I provide suitable hand operated means for rotating the screw 39, and as the pitch of the left-hand thread 40 is the same as that of the right hand thread 41, it follows that when the screw is rotated the block 44 will move toward the front of the machine while the block 42 will move an equal distance toward the back of the machine. In this way, whatever may be the adjustment of the blocks, it will follow that in the latched position the roller 15 will be as far back of the vertical line 38 before the roller is unlatched as it will be forward of the vertical line 38 after the roller has been unlatched and moved forward (see Figs. 12 and 13).

I provide the screw 39 with an indicator or indicating means for indicating the proper position to leave the screw in, to correspond with different thicknesses of hides to be measured. For this purpose the forward end of the screw 39 is provided with a small hand wheel 53 which carries a pinion 54 meshing with a large gear wheel 55 disposed at one side (see Figs. 4 and 5). The edge of this gear wheel rotates adjacent to a fixed pointer 56 and the face of the wheel carries three marks, 59, 60 and 61; the mark 59 corresponds to a heavy or thick hide, the mark 60 corresponds to a hide of medium thickness and the mark 61 corresponds to a thin hide. Whichever mark lies opposite the pointer 56, the blocks 44 and 42 will be in the proper position to give the roller 15 the amount of swing which it should have to compensate for, or correct the indicator reading for that thickness of hide.

It should be understood that when the dog 37 is released from the latch 45 by energizing the electro-magnet 49, the weight of the channel bar 13 carried by the end brackets 11 and 12 will be sufficient to swing the roller forward. The brackets 11 and 12 are provided with suitable handles 11$^a$ and 12$^a$ for swinging the roller back to latch it in its rearmost position.

I shall now describe the automatic means I provide for closing the circuit through the electro-magnet 49 to effect the release of the roller when the hide commences to move through the machine. This may be accomplished in any suitable manner. I prefer, however, to provide a contact device which is actuated by one or more of the plates 22. If desired, there may be a great number of these contact devices disposed equidistant across the machine and connected in parallel in a circuit, so that the operation of any contact device will close the circuit. However, for the purpose of illustration, I have shown a single contact device 62 (see Figs. 11 and 16). This contact device is attached in any suitable manner, to the cross-bar 18, and is provided with a plunger 63 lying directly below the tail 22$^a$ which forms the rear end of each of the plates 22. Now, when the hide strikes the measuring roller, the measuring wheel 24 that corresponds to this part 22$^a$, rocks on its pivot 23, and the tail 22$^a$ engages the plunger 63 of the contact device and closes the circuit 64, (see Fig. 16) which circuit includes a suitable battery 65, and the aforesaid electro-magnet 49.

In order to prevent sparking between the tail 22$^a$ and the plunger 63 when the tail breaks connection with the plunger, I provide means for opening the circuit at another point previously, for example, when the channel bar 13 falls. This device is indicated diagrammatically at 66 in Fig. 16. It is also illustrated in detail in Fig. 6. This device may simply consist of an insulating block 67 attached to the under side of the channel bar 13, and carrying a contact 68 to which one of the circuit wires 69 is attached. When the bar 13 is elevated, the end of the contact 68 lies between two fixed contacts 70 (insulated on the frame,) in the manner of a knife-switch, said contacts being connected by a circuit wire 71 with the contact device 62. With this arrangement, it will be evident that when the bar 13 falls, the circuit will be broken, and hence no spark will occur when the tail 22$^a$ separates from the plunger 63.

Referring to Figs. 1 and 17, the dial 31 is provided with two windows 72 and 73, through the former of which can be seen the numbers of a totalizer 74, and through the window 73 a counter 75 can be seen. This totalizer and this counter are actuated by a shaft 76 which is driven by the gear train which rotates the spindle 30. This shaft 76 is provided with a gear wheel 77 which drives the counting wheels of the totalizer 74, and is also provided with a gear wheel 78 which drives the hands of the indicator 32. On the forward side of the machine, knobs or thumb heads 79 and 80 are provided for the purpose of setting back the totalizer 74 and the counter 75 to zero.

I shall now describe the mechanism for setting the pointers 33 back to zero after a hide has been measured.

For this purpose, the spindle 30 of the dial is provided with a pair of heart-shaped cams 81 and 82, the points of which are slightly out of line with each other. These cams are to coöperate with two resetting levers, 83 and 84 both of which are pivotally mounted on a pivot screw 85 and each of which has a V-shaped point 86. When the lever 84 is swung in the direction which will bring the points 86 against the cams 81 and 82 they will cause the rotation of the cams and the spindle, and the rotation will eventually stop when the points 86 are at the lowest point on the cam. (see Fig. 20). This position of the cam corresponds to the zero position of the pointer. I provide two of the cams so as to prevent any possibility of the cam being struck exactly on its point as might occur if there were only one cam. If that occurred, of course, the cam would not be revolved by the lever.

These levers 83 and 84 are rigid with an actuating arm 87 which may be moved at will by means of a link 88 which extends downwardly and which is attached at its lower end to a hand-lever 89 which extends through a slot 90 on the front of the machine and carries a handle 91 which may be seized by the operator of the machine. The lever 89 is connected by a link 92 with a lever or arm 93 the actuation of which advances the number wheels of the counter 75, so that whenever the lever 89 is actuated, the pointer of the dial is set back to zero and the counter 75 is actuated to indicate or add "1" for the hide which has just been measured.

In order to insure that the pointer 30 will stop exactly at zero, I provide a disk 93$^a$ which is carried by the spindle 30, and the end of which is provided with a notch 94. Coöperating with this notch I provide a detent 95 which is pivoted at 96; this detent 95 has a toe 97$^a$ which engages a main toe 98 which extends up from the arm 87. A spring 99 attached to the arm 87 normally holds the arm up as shown in Fig. 17, and the spring 100 that connects the pivot screw 85 with the detent 95 normally holds the toes 97 and 98 in engagement with each other. When the link 88 is pulled down however, after the V-points have engaged the cams 81 and 82, the toe 98 will move away from the toe 97 and permit the spring 100 to pull the detent 95 down onto the edge of the disk 93$^a$ and when the disk 93 has rotated sufficiently to bring the notch 94 into alinement with the end of the detent 95, the detent will stop the rotation of the disk and hold the pointers 33 in the zero position. I provide automatic means for disengaging the spindle 30 from the driving mechanism to permit it to be returned to the zero position in the manner described. This is effected through the agency of a clutch 101, (see Fig. 21). This clutch includes a movable clutch member 101$^b$ which is splined on the spindle and the clutch member 101$^a$, which is carried on a tubular sleeve 102 driven through bevel gears 103 and 104. The movable clutch member 101$^b$ is normally held against the clutch member 101$^a$ by means of a coil spring 105 (see Fig. 21), and this clutch member is engaged by a shifter 106 which hangs down from a pivot 107 carried between brackets 108. The forward side of this shifter carries a roller 109 with which coöperates a cam 110 carried by the under or inner face of the arm or lever 83. Now, when the arm 83 swings up, the cam 110 engages the roller 109 and swings the shifter 106 rearwardly, thereby opening the clutch. This opening of the clutch is accomplished by the arm 83 at, or before the time that the arms 83 and 84 engage the heart-shaped cams 81 and 82.

While the counter 75 may be actuated through the medium of the handle 91 of the lever 89, I prefer to provide means for actuating the lever 89 automatically through the medium or the agency of the cross-bar 13. In order to accomplish this, I provide a lever 111 (see Fig. 6) which is pivotally mounted at 112 on the frame of the machine, the forward end of this lever being attached to two links 113 and 114, the upper ends of which are attached to the lever 89 (see Fig. 18). The long arm of the lever 111 is connected by a lost motion device, or a one-way actuating device with the bar 13 that actuates the lever 111 during the return movement of the bar 13 instead of by the downward movement of the bar 13. For this purpose, near the upper side of the bar 13, I pivotally attach a link 115 which is of bifurcated form and provided with slots 116 in its two plates 115ᵃ and 115ᵇ. These slots receive a bolt 117 which passes through the end of the lever 111. The upper ends of the slots 116 have a lateral extension or notch 118. The bifurcated link 115 is provided with a spring 119 which tends to rotate it about its pivot in a clockwise direction, as viewed in Fig. 6. A small link 116ᵃ is provided carrying a lost motion device 116ᵇ.

This device limits the outward movement by the spring 119, but permits a slight contraction in length of the link 116ᵃ. Now, when the bar 13 descends, the slots 116 will slide along the bolt 117 until the notches 118 come opposite the bolt, and then the spring 119 will rotate the link 115 toward the right and engage the notches 118 with the bolt. Then, as the bar 13 moves back or rises to its normal position, the lever 111 will be rocked, and the links 113 and 114 will actuate the lever 89; this will set the indicator back to zero and perform the other functions described above. As the bar 13 ascends the link 116ᵃ extends to its full length and finally pulls the link 115 inward; this disengages the notches 118 from the bolt 117.

In order to cushion the movement of the rocking-frame composed of the end brackets 11 and 12, and the channel bar 13, I provide the lower end of each end-bracket 11 or 12 with an oil dash-pot 120 (see Fig. 3).

The reason for the inaccuracy of measurement which ordinarily occurs in machines of this type will be apparent from an examination of Figs. 14 and 15. Fig. 14 indicates the position of a piece of leather 121, which is passing toward the right between two rollers. It will be evident that when the forward edge of the leather arrives at the line 122, the upper roller 123 will commence to revolve and the hide will operate to rotate the roller 123 until the rear edge of the hide arrives at the line 124, hence it will be seen that the roller 123 will have a peripheral movement equal to the width of the hide plus the distance between the lines 122 and 124. The swinging movement of the guide roller described above takes place while the article being measured is touching the rollers and produces a decrease or correcting movement at the indicator, that compensates for this over-measurement and enables the indicator to indicate the true measurement of the hide.

I shall now briefly describe the mode of operation of the complete machine.

The operator, by pressing down on the handles 11ᵃ and 12ᵃ swings the roller 15 back and the tooth or dog 37 is engaged and held by the latch or pawl 45 (see Fig. 5), thereby holding the roller 15 in the relation indicated in Fig. 10. By means of the hand wheel 53, the operator sets the regulator screw 39 in the position corresponding to the thickness of the hide which is to be measured. The hide is then run through the machine. As the forward edge of the hide passes into the space between the roller 15 and the measuring wheels 24, it raises the measuring wheels, and this rocks the tail 22ᵃ of the plate 22 (see Fig. 11) so that it engages the plunger 63 (see Figs. 2 and 16). This closes the circuit through the electro-magnet 49 which attracts the armature lever 50, and this pulls down on link 51 and releases the tooth 47 from the latch 45. The weight of the frame bar 13 then operates to rock the end brackets 11 and 12 and throws the roller 15 into its forwardly disposed position such as indicated in Fig. 13. Even if the frame bar 13 did not tend by gravity to swing down, it would be pulled down by the reaction of the hide when pulled forward by the roller 15.

By referring to Fig. 10, it will be seen that when the hide separates the rollers, that is to say, when it raises the measuring roller which controls the tail 22ᵃ, the forward edge of the hide will be about on the vertical center line 38. Likewise, when the hide leaves the rollers, its rear edge will be about on this vertical line 38. Hence, the measuring wheel will have been rotated an amount equal to the width of the hide. The motor 9 drives the roller 15 through the belt 6. The rotation of all the measuring wheels is imparted through the differential mechanism 27, etc., up to the indicator 32, (see Fig. 1), and this movement is also imparted to the measuring wheels of the totalizer 74. After the hide has passed through the machine, the operator depresses the handles 11ᵃ and 12ᵃ; this relatches the roller 15 in its rearmost position as indicated in Fig. 10.

When the channel bar 13 descends, in setting the roller 15 forward as described above, the bifurcated link 115 descends with the bar 13 and when it has descended far enough, the spring 119 operates to pull the bifurcated link 115 toward the right, and this engages the bolt 117 in the notches 118. Now, when the handles 11ᵃ and 12ᵃ are operated, the channel bar 13 rises again, and in doing so it operates the lever 111;— this pulls down on the links 113 and 114 which actuate the lever 89. Obviously, if desired, the lever 89 can be dispensed with and the links 113 and 114 attached directly to the lower ends of the links 88 and 92.

When the links 88 and 92 are actuated in this way the link 92 actuates the counter 75 and the link 88 operates the resetting mechanism that sets the pointers 33 of the indicator back to the zero position. The mode of operation of this resetting mechanism has been fully described above.

It is evident that the invention I have described herein for compensating for the thickness of an article being measured, can be applied to a machine having a single measuring roller or wheel, as well as a machine of the type described, which has a large number of measuring wheels. The invention, however, is particularly useful as applied to a machine of the type illustrated on account of its employing a large number of wheels, because increasing the number of wheels multiplies the error of the indication at the indicator. Therefore, I wish it distinctly understood that I do not limit myself in the practice of this invention to machines of the particular type described.

What I claim is:

1. In a machine of the kind described, the combination of a measuring wheel adapted to roll upon the surface of the article being measured as it passes through the machine, an indicator actuated thereby, a guide roller coöperating with the measuring wheel, and means for giving the guide roller a limited circumferential movement while the article being measured is touching the roller and wheel, to change the relative position of the guide roller with respect to the measuring wheel and produce a correcting movement in the indicator to compensate for the thickness of the article measured.

2. In a measuring machine of the kind described, the combination of a measuring roller or wheel adapted to roll upon the surface of the article being measured as it passes through the machine, an indicator actuated thereby, a roller coöperating with the measuring roller and mounted to swing in a front and rear direction, and means for swinging the last named roller forwardly when the article is introduced into the machine to compensate for the thickness of the article being measured.

3. In a measuring machine of the kind described, the combination of a measuring roller or wheel adapted to roll upon the surface of the article being measured as it passes through the machine, an indicator actuated thereby, a roller coöperating with the measuring roller and mounted to swing in a front and rear direction, means for swinging the last named roller forwardly when the article is introduced into the machine to compensate for the thickness of the article being measured, and means for adjusting the amount of swinging movement of the last named roller.

4. In a measuring machine of the kind described, the combination of a measuring roller or wheel adapted to roll upon the surface of the article being measured as it passes through the machine, an indicator actuated thereby, a power-driven roller coöperating with the measuring roller or wheel and mounted to swing in a front and rear direction with respect to the measuring roller, and means for swinging said last named roller forwardly when the article is introduced into the machine, to compensate for the thickness of the article measured.

5. In a measuring machine of the kind described, the combination of a frame, a plurality of measuring wheels carried by said frame, a guide roller over which passes the article to be measured while maintaining contact with the measuring wheels, an indicator actuated by the measuring wheels, and means for giving said roller a circumferential movement with respect to the measuring wheels while the article being measured is touching the roller and wheels, to allow for the thickness of the article being measured.

6. In a machine for measuring hides and the like, the combination of a frame, a plurality of measuring wheels carried by said frame, a roller coöperating with the measuring wheels and over which the hide passes in contact with the measuring wheels, a pivotally mounted swinging frame supporting said roller, and means for effecting the swinging of said swinging frame forwardly to change the position of the roller with respect to the measuring wheels when the hide is introduced into the machine, to allow for the thickness of the hide and impart a correct measuring movement to the indicator.

7. In a machine for measuring hides and the like, the combination of a frame, a plurality of measuring wheels carried thereby, a power-driven roller coöperating with said wheels, over which the hide passes when in contact with the measuring wheels, an indicator, differential mechanism for actuating said indicator from said wheels, and means for giving said roller a circumferential movement with respect to the measuring wheels while the hide is touching the roller and wheels, to allow for the thickness of the hide.

8. In a machine for measuring hides and the like, the combination of a frame, a guide roller, a plurality of measuring wheels carried by the frame for engaging the surface of the hide as it passes through the machine, an indicator, differential mechanism for driving the indicator from said wheels, and means for shifting the guide roller circumferentially with respect to the wheels while the hide is touching the wheels and the roller to produce a correcting movement at the indicator to compensate for the thickness of the hide.

9. In a machine for measuring hides and the like, the combination of wheels adapted to be rotated by the hide in passing through the machine, an indicator actuated thereby, a roller coöperating with the measuring wheels, means for movably supporting the roller for changing its relative position with respect to the wheels, and automatic means for giving the last named means a circumferential movement, controlled by the hide as it passes under the wheels, to change its position relative to the measuring wheels and thereby compensate for the thickness of the hide.

10. In a machine for measuring hides and the like, the combination of wheels adapted to be rotated by the hide in passing through the machine, an indicator actuated thereby, a roller coöperating with the measuring wheels, means for movably supporting the roller for changing its relative position with respect to the wheels, means for driving said roller, and automatic means for giving the last named means a circumferential movement, controlled by the hide as it passes under the wheels, to change its position relative to the measuring wheels and thereby compensate for the thickness of the hide.

11. In a machine for measuring hides and the like, the combination of a frame, wheels carried by the frame adapted to be rotated by the hide in passing through the machine a swinging frame, an indicator actuated thereby, a roller carried by said swinging frame and coöperating with the measuring wheels, means for driving said roller, means for holding said swinging frame in a rearwardly disposed position before the hide is introduced into the machine, means for moving the swinging frame as the hide is introduced into the machine to change the relative position of the roller with respect to the measuring wheels and thereby compensate for the thickness of the hide, and impart a correct measuring movement to the indicator.

12. In a machine for measuring hides and the like, the combination of a frame, wheels carried by the frame adapted to be rotated by the hide in passing through the machine, a swinging frame, an indicator actuated by the wheels, a roller carried by said swinging frame, and coöperating with the measuring wheels, means for driving said roller, an electrically controlled latch for holding said swinging frame in a rearwardly disposed position before the hide is introduced into the machine, circuit closing means actuated by one of said wheels for releasing the latch when the hide passes under the wheels to permit the swinging frame to swing forward and change the relative position of the roller with respect to the measuring wheels, thereby compensating for the thickness of the hide and imparting a correct measuring movement to the indicator.

13. In a machine for measuring hides and the like, the combination of a frame, a plurality of measuring wheels carried thereby, an indicator actuated by the measuring wheels, a swinging frame pivotally supported on said first named frame, a roller carried thereby and coöperating with the measuring wheels to pass the hide through the machine, electrically controlled latching means for holding said swinging frame in a rearwardly disposed position before the hide is introduced into the machine, means actuated by one of said rollers when the hide passes under the same for closing a circuit through the latching device to release the swinging frame, said swinging frame operating to swing forwardly and hold the roller in a forwardly disposed position with respect to the measuring wheels, and thereby compensate for the thickness of the hide and impart a correct measuring movement to the indicator.

14. In a machine of the kind described, the combination of a measuring roller or wheel adapted to roll upon the surface of the article being measured as it passes through the machine, an indicator actuated thereby, a roller coöperating with the measuring roller or wheel, means for giving said last named roller a circumferential movement to change its relative position with respect to the measuring roller and thereby compensate for the thickness of the article measured and produce a correct advance of the indicator, and a regulating device for controlling the amount of the circumferential movement of said roller.

15. In a machine for measuring hides and the like, the combination of a frame, a plurality of measuring wheels carried by said frame, a roller coöperating with the measuring wheels and over which the hide passes in contact with the measuring wheels, a pivotally mounted swinging frame supporting said roller, means for effecting the swinging of said swinging frame forwardly to change the position of the roller with respect to the measuring wheels when the hide is introduced into the machine, to allow for the thickness of the hide, and impart a correct measuring movement to the indicator, a latch for normally holding said swinging frame in a rearwardly disposed position, a stop for limiting the forward swinging movement of the swinging frame, and means for simultaneously adjusting the latch and the stop to adapt the swinging movement of the swinging frame to hides of different thickness.

16. In a machine for measuring hides and the like, the combination of a frame, a plurality of measuring wheels carried thereby, a counter actuated by said measuring wheels to indicate the area of the hide measured, a swinging frame, a roller carried thereby to coöperate with the measuring wheels, means for controlling said swinging frame to change the position of the roller with respect to the measuring wheels to compensate for the thickness of the hide measured, and means actuated through the agency of said swinging frame for actuating said counter and for setting back the indicator to its zero position.

17. In a machine for measuring hides and the like, the combination of a frame, a plurality of measuring wheels carried thereby, a counter actuated by said measuring wheels to indicate the area of the hide measured, a swinging frame, a roller carried thereby to coöperate with the measuring wheels, means for holding the swinging frame with the roller in a rearwardly disposed position, means for automatically releasing the swinging frame to permit the same to swing forwardly as the hide is introduced into the machine, means for returning the swinging frame to its rearmost position, and means actuated by the return movement of the swinging frame for setting the counter back to zero.

18. In a machine for measuring hides and the like, a frame, a plurality of measuring wheels to contact with the surface of the hide, a counter actuated by the measuring wheels, a swinging frame, a roller carried thereby to coöperate with the measuring wheels, means for effecting the swinging of said frame to move the roller with respect to the wheels to compensate for the thickness of the hide, an indicator having a movable pointer, a clutch for driving said pointer from the measuring wheels, and means actuated through the agency of said swinging frame for opening said clutch, for returning the pointer to zero, and for actuating said counter.

19. In a machine for measuring hides and the like, the combination of a frame, a plurality of measuring wheels, an indicator having a dial, a movable pointer, a clutch through which said measuring wheels drive said pointer, a swinging frame, a roller carried thereby coöperating with said wheels, said pointer having a spindle with returning cams mounted thereupon, arms actuated by said swinging frame for engaging said cams to return the pointer to zero position, a clutch-shifter for opening the clutch, and means actuated by one of said arms for opening said clutch before returning the pointer to zero position.

20. In a machine of the kind described, the combination of a frame, wheels carried by the frame adapted to be rotated by the article being measured in passing through the machine, an indicator actuated by the wheels, a swinging frame, a roller carried by the swinging frame and coöperating with the wheels, electrical means for holding said swinging frame in a rearwardly disposed position before the article is introduced into the machine, circuit closing means actuated by one of said wheels for releasing the swinging frame from said electrically controlled means to permit the swinging frame to swing forward and change the relative position of the roller with respect to the wheels, and automatic means for breaking the circuit at a point other than at said circuit closing means, to prevent sparking at said circuit closing means.

21. In a machine for measuring hides and the like, the combination of a frame, a plurality of measuring wheels carried thereby, a counter actuated by said measuring wheels to indicate the area of the hide measured, a swinging frame, a roller carried thereby to coöperate with the measuring wheels, means for controlling said swinging frame to change the position of the roller with respect to the measuring wheels to compensate for the thickness of the hide measured, a link attached to said swinging frame and having a slot therein with a laterally disposed notch, a lever and means actuated thereby for actuating said counter and for setting back the indicator to its zero position, a pin carried by said lever running in said slot, and a spring associated with said link for moving the same when said swinging frame swings forwardly, to engage the notch with the pin of said lever, whereby the return movement of said swinging frame will actuate the counter and set back the indicator to zero.

22. In a machine for measuring hides and the like, the combination of a frame, a plurality of measuring wheels carried thereby, a counter actuated by said measuring wheels to indicate the area of the hide measured, a swinging frame, a roller carried thereby to coöperate with the measuring wheels, means for controlling said swinging frame to change the position of the roller with respect to the measuring wheels to compensate for the thickness of the hide measured, a link attached to said swinging frame and having a slot therein with a laterally disposed notch, a lever and means actuated thereby for actuating said counter and for setting back the indicator to its zero position, a pin carried by said lever running in said slot, a spring associated with said link for moving the same when said swinging frame swings forwardly, to engage the notch with the pin of said lever, whereby the return movement of said swinging frame will actuate the counter and set back the indicator to zero, and a lost-motion device connecting said link with the frame to facilitate the coöperation of said link with said lever and pin.

23. In a machine for measuring hides and the like, the combination of a frame, a plurality of measuring wheels carried by said frame, a roller coöperating with the measuring wheels and over which the hide passes in contact with the measuring wheels, a pivotally mounted swinging frame supporting said roller, means for effecting the swinging of said swinging frame forwardly to change the position of the roller with respect to the measuring wheels when the hide is introduced into the machine, to allow for the thickness of the hide, and impart a correct measuring movement to the indicator, a latch for normally holding said swinging frame in a rearwardly disposed position, a stop for limiting the forward swinging movement of the swinging frame, a block carrying said latch, an adjusting screw having a thread of one character carrying said block and a thread of opposite character carrying said stop, whereby the rotation of said adjusting screw will adjust said stop and said latch simultaneously in opposite directions.

In testimony whereof, I have hereunto set my hand.

DOUGLAS TURNER.